July 16, 1957 D. L. VERGASON 2,799,833

ULTRA HIGH FREQUENCY TUNING MECHANISM

Filed Aug. 31, 1954 2 Sheets-Sheet 1

INVENTOR
DURWARD L. VERGASON
BY
Michael Hertz,
ATTORNEY

ULTRA HIGH FREQUENCY TUNING MECHANISM

Filed Aug. 31, 1954 2 Sheets-Sheet 2

INVENTOR
DURWARD L. VERGASON
BY
Michael Hertz
ATTORNEY

United States Patent Office 2,799,833

Patented July 16, 1957

2,799,833

ULTRA HIGH FREQUENCY TUNING MECHANISM

Durward L. Vergason, Emporium, Pa., assignor to Sylvania Electric Products Inc., a corporation of Massachusetts Application August 31, 1954, Serial No. 453,355

7 Claims. (Cl. 333—82)

This invention relates to tuning mechanism and it is especially adapted for tuning ultra high frequency signals. In particular it relates to an improved tuner of the lecher wire type in which means are provided for giving jump or indexed band tuning with vernier tuning in each of the bands, to select a sub-band.

It is an object of the invention to provide in such a tuner a simple means to enable accurate and reproducible tuning to any selected band of frequency and to enable fine tuning in order to pick out a particular smaller frequency band in the first band.

For a full understanding of my invention attention is directed to the following specification and the accompanying drawings in which—

Figures 1, 2:
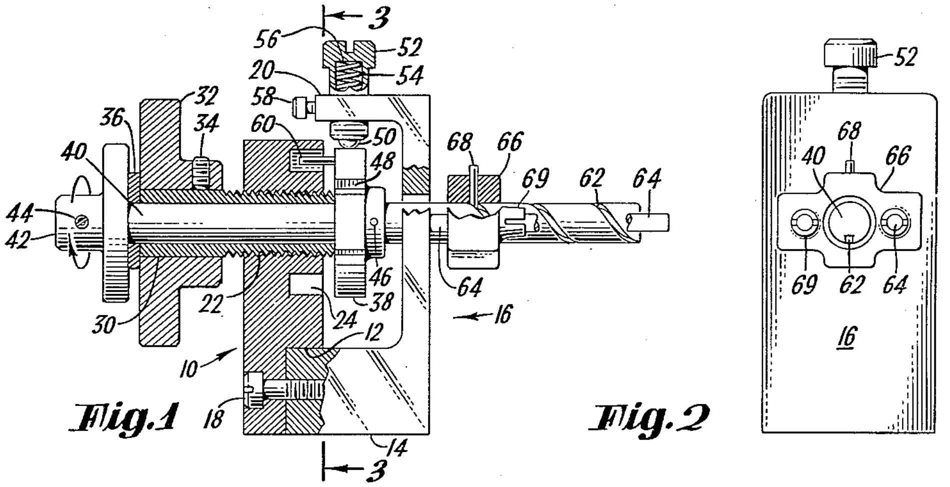
Fig. 1 is an elevational view, partly in section, showing my improved tuner.
Fig. 2 is an end-view thereof.
Figure 3:
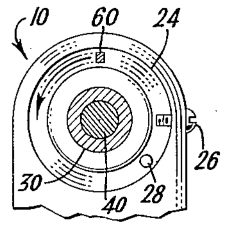
Fig. 3 is a fragmentary sectional view through the tuner on the line 3—3 of Fig. 1.

Referring to the drawings more in detail, in Fig. 1 there is disclosed a front bearing block 10 having an undercut or stepped portion 12 to receive the base portion 14 of a rear rod supporting block 16. The blocks are secured together by screws 18 passing through the block 10 and threaded into the base portion 14. The rear block 16 at its upper end has a forwardly directed lip 20. The forward block 10 has an internally threaded bore 22 and, in its rear face, a circular recess 24. Threaded into the block 10, see Fig. 3, are two stops 26 and 28. The stop 26 is here shown as a screw, threaded through the block 10, traversing the recess 24, while the stop 28 is shown as a pin in the block extending rearwardly into the recess.

The bore 22 receives an externally threaded sleeve 30 on which is fastened a knob 32, as by a set screw 34, the knob being utilized for fine tuning of the instrument. The sleeve is confined between a washer 36 at the forward end and a notched indexing wheel 38 at the other end. Therefore threading of the sleeve so as to cause it to move forwardly will move the washer 36 forwardly and threading the sleeve in the opposite direction will cause the index wheel 38 to move backwardly. The washer 36 is mounted on a shaft 40 rotatable within the sleeve 30 and the washer is positioned between the sleeve 30 and a coarse tuning knob 42 held on the shaft 40 by a set screw 44 or the like. The index wheel 38 is secured to the shaft 40 and in abutting relation to the sleeve 30 by a pin 46 or the like. The wheel 38 is provided with notches or recess 48 cooperating with a ball detent 50 held against the peened over lower end of a hollow screw 52 by a spring 54 within the screw, the spring reacting between the ball detent and the top of the recess in the screw. A screw 58 locks the ball detent mechanism in place in a bore in the lip 20. A pin 60 extending forwardly from the index wheel 38 and into the recess 24 serves to limit rotation of the wheel and therefore of the shaft 40 to the angular distance between the stops which may be as close to 360° as is feasible.

The rearward end of shaft 40 projects loosely through the block 16 and has cut into it a spiral channel 62 with any uniformity or non-uniformity of pitch desired but extending at least 360° around the shaft.

Projecting from and rigidly secured to the rear face of the back block 16 is a pair of spaced metallic rods 64, 64, adapted to be connected to the apparatus being tuned, said rods being bridged by a slidable metallic block 66, the bridge block being provided with bores within which are slidably positioned the shaft 40 and the rods 64. A pin 68 or the like, the inner end of which is engaged with the spiral channel 62 passes through the block 66 and serves to convert the rotative movement of shaft 40 into translatory movement of the block.

To effect good electrical connections between the bridge member 66 and the rods 64, the bridge member has welded or otherwise secured thereto split spring sleeves 69 pressed to the rods 64.

As a result of the above construction, when the knob 42 is rotated, the shaft 40 will also be rotated causing the bridge member 66 to slide along the rods 64 with a displacement determined by the pitch of the screw and the angular revolution of the shaft. Also rotating with the screw is the previously described index wheel which determines the jump spacing or indexing of the bridge member.

Rotation of the fine tuning knob 32 causes the sleeve 30 to which the knob is secured, to engage either the washer 36 or the wheel 38 dependent on direction of rotation of the sleeve, to cause these elements to move laterally, translating along with them the shaft 40 and the bridge member 66, via the pin 68. The thread in the bore 22 may be made as fine as desired to secure as fine adjustment of the bridge member on the rods 64 as may be desired. The distance between the knob 32 and the front face of the block 10, when the shaft is advanced to the front is at least sufficient to allow for fine tuning from one index position of the bridge member to the next.

In use, the bridge member may be provided with indicators movable opposite suitable scales to indicate to what frequency the lecher rods have been tuned.

Figure 4:
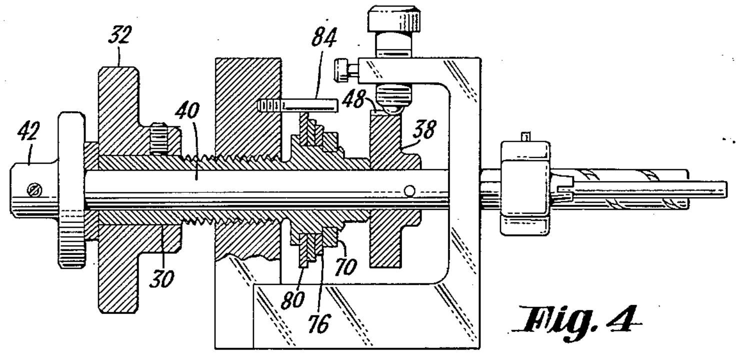
Fig. 4 is a view similar to Fig. 1, showing a modified form of my tuner.
Figure 5:
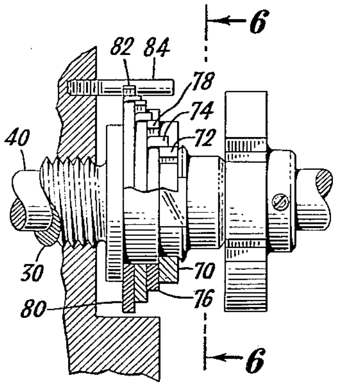
Fig. 5 is a view, partly in section, showing the rotation counting arrangement in the modified tuner of Fig. 4.
Figure 6:
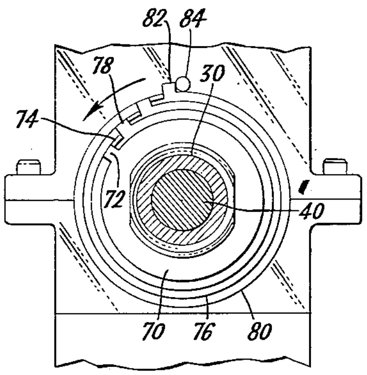
Fig. 6 is an end view looking into the counter.

In the form of invention just disclosed, rotation of the sleeve 30 and lateral displacement of the shaft 40 is limited by reason of engagement of the index wheel 38 with a face of block 16 or by reason of engagement of the wheel with a face of block 10. Since the detent wheel is rigid with shaft 40, this arrangement might result in a binding action on the part of operation of that shaft. To insure non-binding of the shaft 40 and to extend the limits of rotation of sleeve 30, the counter-wheel arrangement of Figs. 4 to 6 is employed. In this embodiment, rotation of knob 32 rotates the sleeve 30 and also a disc 70 secured to the sleve for rotation therewith. The disc has a radial projection 72, see Fig. 6, which on rotation of the knob engages an axially directed peripheral lip 74 on an adjacent disc 76 freely rotatable on a hub of the sleeve 30. Disc 76 in turn has a radial projection 78 engaging a lip on a third disc, etc. The last disc 80 has a projection 82 engageable with a stop 84 fixed to the block 10. Thus as many revolutions of the sleeve 30 are permitted as desired to enable fine tuning throughout the entire range of a channel selected by operation of coarse tuning knob 42, without possibility of binding of parts.

Figure 7:
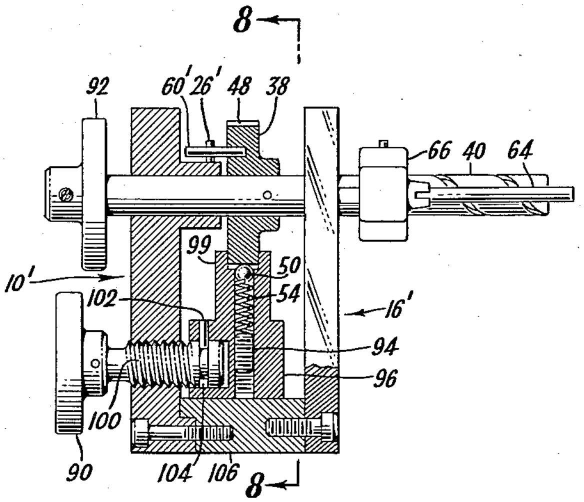
Fig. 7 is a view similar to Fig. 1 showing a still further modified form of tuner.
Figure 8:
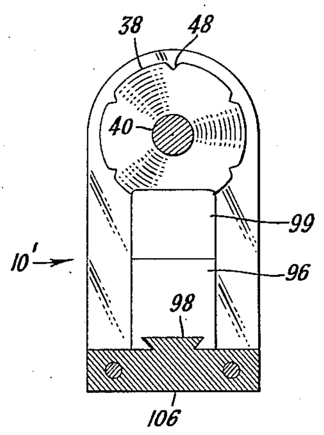
Fig. 8 is a section in the line 8—8 of Fig. 7.

In the form of invention disclosed in Figs. 7 and 8, the fine tuning knob 90 is arranged eccentrically with resepct to the coarse tuning knob 92. As before, rotation of coarse tuning knob 92 rotates the shaft 40 mounted loosely in bearings in blocks 10' and 16' and the index wheel 38. The rotation of the shaft 40 under control of the index wheel causes the bridge member 66 to index from position to position along the shaft. The detent ball 50 engaging in the notches of the detent wheel determines coarse positioning of the bridge member on the lecher rods 64. The ball 50 with its spring 54 and retaining screw 94 are mounted in a slide block 96 slidable on dovetailed way 98. The slide block has checks 99 overlapping both faces of the index member, so that lateral movement of the block 96 will translate the index member 38 and along with it the shaft 40 and bridge member 66. The slide block is finely adjusted by the screw 100 threaded into block 10' and has rotatable but non-slidable connection with the slide block 96 by pin and groove connection 102, 104. As shown, the spacing between the slide block 96 and the rear wall 16' and the length of the screw 100 are such as to permit full adjustment of the bridge member from one index position to the adjacent index position; but by making the base piece 106 and the screw longer, the fine tuning knob 90 may be employed to move the bridge member from one end of the spiralled portions of the shaft 40 to the other. The stop pin 60' when the longer base piece is employed may be a telescopic pin spring urged to attain elongation thereof or may be a longer pin. Said pin is engageable with a fixed stop element 26' on block 10'.

Figure 9:
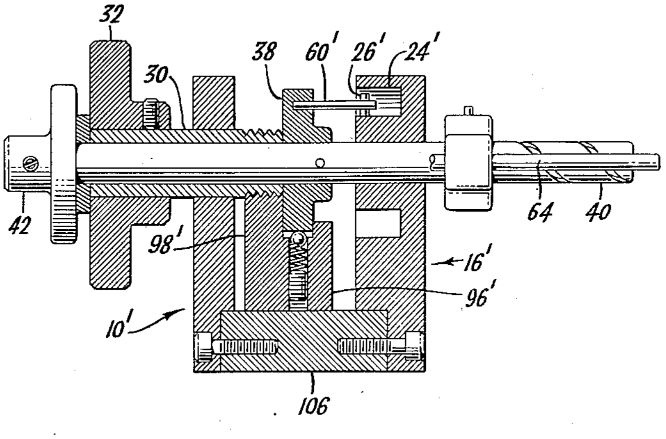
Fig. 9 is a view similar to Fig. 7 of yet another modification of my invention.

In the form of invention disclosed in Fig. 9 the fine and coarse tuning knobs 32 and 42 are again arranged concentrically, the knob 32 being fast with the threaded sleeve 30. However, instead of the sleeve being threaded in the front bearing block 10, it is engaged with a block 96', similar to block 96 except that one cheek, 98', is extended to threadedly engage with and partially surround the thread on sleeve 30. In this case the stop pin 60' is shown to extend toward an abutment member 26' extending radially from a hub of rear bearing wall 16', the wall being provided with a circular recess 24' to receive the pin 60' as the block 96' is advanced to the right. As before the thread on sleeve 30 and the base piece 106 may be made as long as is desired to permit fine tuning over the full length of the spiralled portions of shaft 40 and the pin 60' be made telescopic or longer.

In all cases, with the constructions drawn, it is possible to quickly adjust the bridge member to a selected channel or band of frequencies and then finely adjust the bridge to the desired band of frequencies.

Having described my invention, what I claim as new is:

1. A tuner comprising a base structure, a pair of lecher rods supported by said base structure, a bridge member shorting said lecher rods and means for moving said bridge member along the rods comprising a shaft supported by said base structure, said shaft lying parallel to the lecher rods and movable rotatively and longitudinally, means coupling the bridge member with said shaft to move the bridge member along the rods on rotation of the shaft, said bridge member also being movable on the rods upon longitudinal displacement of the shaft, means for rotating the shaft and means for translating the shaft.

2. A tuner comprising a base structure, a pair of lecher rods supported by said base structure, a bridge member slidable along the rods and means for moving said bridge member comprising a sleeve, supported by said base structure, said sleeve lying on an axis intermediate and parallel to the lecher rods, a shaft rotatable and slidable in said sleeve, a threaded connection between said shaft and said bridge member whereby rotation of said shaft moves the bridge member along the shaft and lecher rods, a threaded connection between the sleeve and the base structure, means cooperating with the sleeve and shaft to effect translatory movement of the shaft on rotation of the sleeve, means for rotating the shaft in the sleeve to shift the bridge member relative to the shaft and means to rotate the sleeve member to shift the shaft and bridge member as a unit relative to the lecher rods.

3. A tuner mechanism comprising a pair of metallic rods and a conductive bridge member slidable along the rods, means for shifting said bridge member comprising a rotatable and longitudinally displaceable shaft, said shaft being parallel to the rods, means to couple the bridge member to the shaft to effect longitudinal displacement of the bridge member on the shaft upon rotation thereof and shiftable movement with the shaft on shifting of the same, means to rotate and to shift the shaft, and indexing means to determine displacement of the bridge member along the shaft.

4. A tuner comprising a pair of metallic rods and a conductive bridge member slidable along the rods in electrical contact therewith, means for shifting said bridge member comprising a shaft parallel to the rods and provided with a threaded end, said bridge member being slidable on said shaft and having a pin therein engaging the threaded end of said shaft, means for rotating the shaft, and means for shifting the shaft longitudinally of itself.

5. A tuner comprising a pair of metallic rods and a conductive bridge member slidable along the rods in electrical contact therewith, means for shifting said bridge member comprising a shaft parallel to the rods and provided with a threaded end, said bridge member being slidable on said shaft and having a pin therein engaging the threaded end of said shaft, means for rotating the shaft, means for limiting the rotation of the shaft, and means for shifting the shaft longitudinally of itself.

6. A tuner comprising a pair of metallic rods and a conductive bridge member slidable along the rods in electrical contact therewith, means for shifting said bridge member comprising a shaft parallel to the rods and provided with a threaded end, said bridge member being slidable on said shaft and having a pin therein engaging the threaded end of said shaft, means for indexing the shaft, and means for shifting the shaft longitudinally of itself.

7. A tuner comprising a pair of metallic rods and a conductive bridge member slidable along the rods in electrical contact therewith, means for shifting said bridge member comprising a shaft parallel to the rods and provided with a threaded end, said bridge member being slidable on said shaft and having a pin therein engaging the threaded end of said shaft, means for rotatably indexing the shft, means for limiting the rotation of the shaft, and means for shifting the shaft longitudinally of itself.

References Cited in the file of this patent

UNITED STATES PATENTS

| | | |
|---|---|---|
| 2,117,090 | Grundmann | May 10, 1938 |
| 2,159,782 | Conklin et al. | May 23, 1939 |
| 2,397,787 | Gubin | Apr. 2, 1946 |